United States Patent
Li et al.

(10) Patent No.: US 11,514,121 B2
(45) Date of Patent: Nov. 29, 2022

(54) WEBPAGE CUSTOMIZATION

(71) Applicant: International Business Machines Corporation, Armonk, NY (US)

(72) Inventors: Dong Rui Li, Beijing (CN); Ang Yi, Beijing (CN); Hai Cheng Wang, Beijing (CN); Jun Hong Zhao, ShangDi (CN); Ye Chen, Beijing (CN); Xiao Jian Lian, Beijing (CN); Jing Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 16/988,825

(22) Filed: Aug. 10, 2020

(65) Prior Publication Data
US 2022/0043870 A1 Feb. 10, 2022

(51) Int. Cl.
G06F 16/9535 (2019.01)
G06F 40/166 (2020.01)
G06F 16/2457 (2019.01)
G06F 16/958 (2019.01)

(52) U.S. Cl.
CPC .... *G06F 16/9535* (2019.01); *G06F 16/24578* (2019.01); *G06F 16/958* (2019.01); *G06F 40/166* (2020.01)

(58) Field of Classification Search
CPC .............. G06F 16/9535; G06F 16/958; G06F 16/24578; G06F 40/166
See application file for complete search history.

(56) References Cited

U.S. PATENT DOCUMENTS

| | | | |
|---|---|---|---|
| 8,555,158 B2 | 10/2013 | Yao et al. | |
| 2009/0305682 A1* | 12/2009 | Spalink | G06F 16/9577 455/414.3 |
| 2014/0289612 A1 | 9/2014 | Mi | |
| 2016/0224991 A1* | 8/2016 | Mukherjee | G06F 16/955 |
| 2017/0109455 A1 | 4/2017 | Berk et al. | |
| 2019/0102362 A1 | 4/2019 | Orciuoli et al. | |

FOREIGN PATENT DOCUMENTS

CN 105468672 B 4/2019

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

* cited by examiner

*Primary Examiner* — Kris E Mackes
(74) *Attorney, Agent, or Firm* — Peter J. Edwards

(57) ABSTRACT

Embodiments of the present disclosure relate to a method, system, and computer program product for webpage customization. In some embodiments, a method is disclosed. According to the method, a webpage to be provided to a user is obtained. The webpage comprises at least a first element having a first set of style attributes. A second element matching the first element is determined from a set of elements customized for the user. The second element has a second set of style attributes. The webpage is customized for the user by applying at least part of the second set of style attributes to the first element. The customized webpage is provided to the user. In other embodiments, a system and a computer program product are disclosed.

12 Claims, 10 Drawing Sheets

WEBPAGE CUSTOMIZATION

BACKGROUND

When presenting a website to a user, it is desirable to customize the website according to the user's favorite style. A website may include a single webpage or a collection of related webpages. Such customization requires changing the logo, fonts, background, icons, colors, and the like of each webpage according to the user's favorite style.

SUMMARY

Some embodiments of the present disclosure can be illustrated as a method. The method comprises obtaining a webpage to be provided to a user, the webpage comprising at least a first element having a first set of style attributes. The method further comprises determining a second element matching the first element from a set of elements customized for the user. The second element has a second set of style attributes. The method further comprises customizing the webpage for the user by applying at least part of the second set of style attributes to the first element. The method further comprises providing the customized webpage to the user.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system comprises a processing unit and a memory coupled to the processing unit. The memory stores instructions that, when executed by the processing unit, perform actions comprising: obtaining a webpage to be provided to a user, the webpage comprising at least a first element having a first set of style attributes; determining a second element matching the first element from a set of elements customized for the user, the second element having a second set of style attributes; customizing the webpage for the user by applying at least part of the second set of style attributes to the first element; and providing the customized webpage to the user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
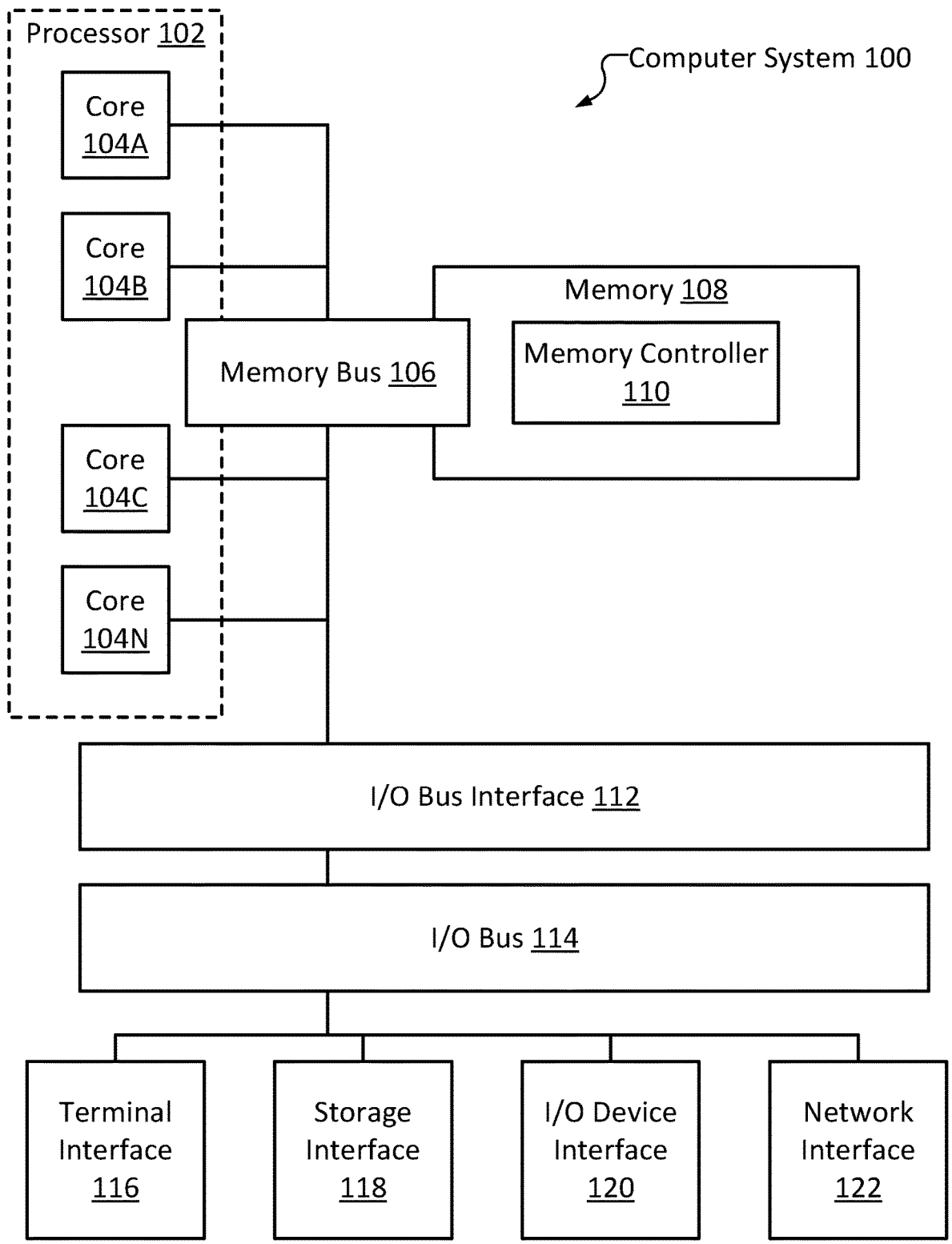
FIG. 1 illustrates a high-level block diagram of an example computer system that may be used in implementing embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to natural language processing. More particular aspects relate to a method, a system, and a computer program product for webpage customization.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, shown is a high-level block diagram of an example computer system 100 that may be configured to perform various aspects of the present disclosure, including, for example, method 1000. The example computer system 100 may be used in implementing one or more of the methods or modules, and any related functions or operations, described herein (e.g., using one or more processor circuits or computer processors of the computer), in accordance with embodiments of the present disclosure. In some embodiments, the major components of the computer system 100 may comprise one or more CPUs 102, a memory subsystem 108, a terminal interface 116, a storage interface 118, an I/O (Input/Output) device interface 120, and a network interface 122, all of which may be communicatively coupled, directly or indirectly, for inter-component communication via a memory bus 106, an I/O bus 114, and an I/O bus interface unit 112.

The computer system 100 may contain one or more general-purpose programmable central processing units (CPUs) 102, some or all of which may include one or more cores 104A, 104B, 104C, and 104D, herein generically referred to as the CPU 102. In some embodiments, the computer system 100 may contain multiple processors typical of a relatively large system; however, in other embodiments the computer system 100 may alternatively be a single CPU system. Each CPU 102 may execute instructions stored in the memory subsystem 108 on a CPU core 104 and may comprise one or more levels of on-board cache.

In some embodiments, the memory subsystem 108 may comprise a random-access semiconductor memory, storage device, or storage medium (either volatile or non-volatile) for storing data and programs. In some embodiments, the memory subsystem 108 may represent the entire virtual memory of the computer system 100 and may also include the virtual memory of other computer systems coupled to the computer system 100 or connected via a network. The memory subsystem 108 may be conceptually a single monolithic entity, but, in some embodiments, the memory subsystem 108 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 102. This may include a memory controller 110.

Although the memory bus 106 is shown in FIG. 1 as a single bus structure providing a direct communication path among the CPU 102, the memory subsystem 108, and the I/O bus interface 112, the memory bus 106 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 112 and the I/O bus 114 are shown as single respective units, the computer system 100 may, in some embodiments, contain multiple I/O bus interface units 112, multiple I/O buses 114, or both. Further, while multiple I/O interface units are shown, which separate the I/O bus 114 from various communications paths running to the various I/O devices, in other embodiments some or all of the I/O devices may be connected directly to one or more system I/O buses.

In some embodiments, the computer system 100 may be a multi-user mainframe computer system, a single-user system, or a server computer or similar device that has little or no direct user interface but receives requests from other computer systems (clients). Further, in some embodiments, the computer system 100 may be implemented as a desktop computer, portable computer, laptop or notebook computer, tablet computer, pocket computer, telephone, smart phone, mobile device, or any other appropriate type of electronic device.

It is noted that FIG. 1 is intended to depict the representative major components of an exemplary computer system 100. In some embodiments, however, individual components may have greater or lesser complexity than as represented in FIG. 1, components other than or in addition to those shown in FIG. 1 may be present, and the number, type, and configuration of such components may vary.

Figure 2:
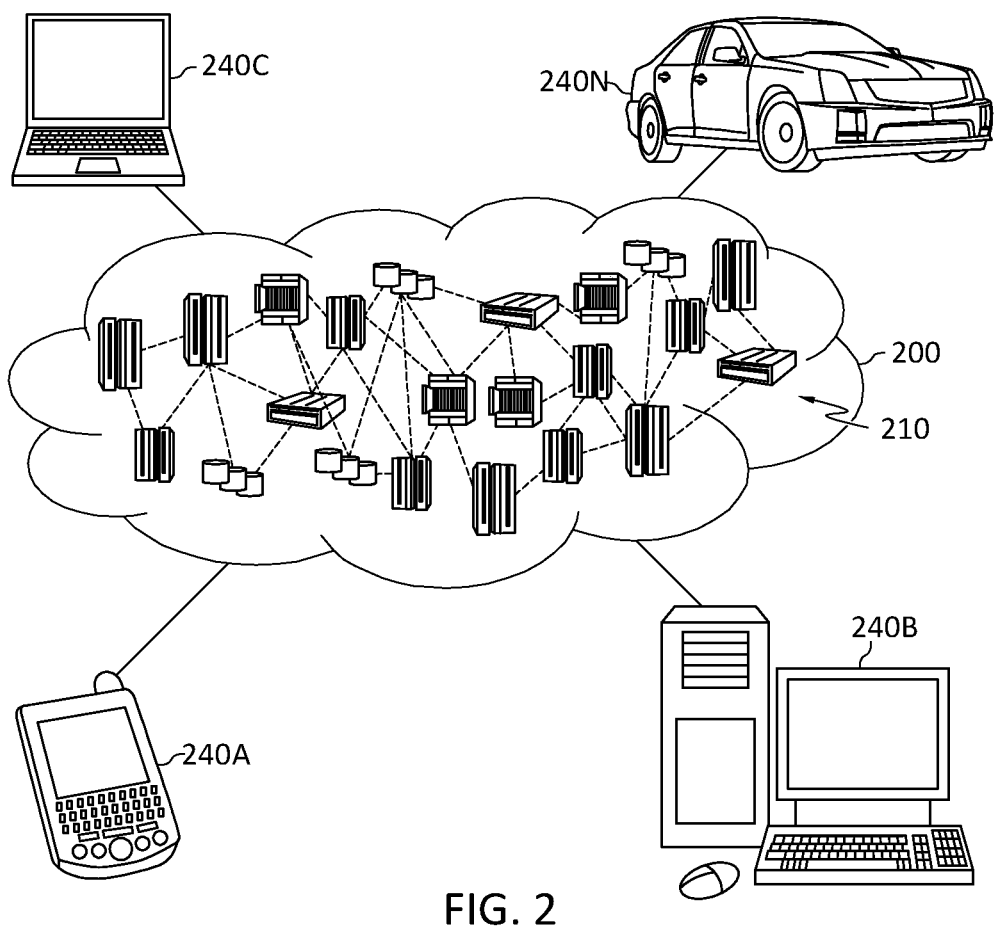
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
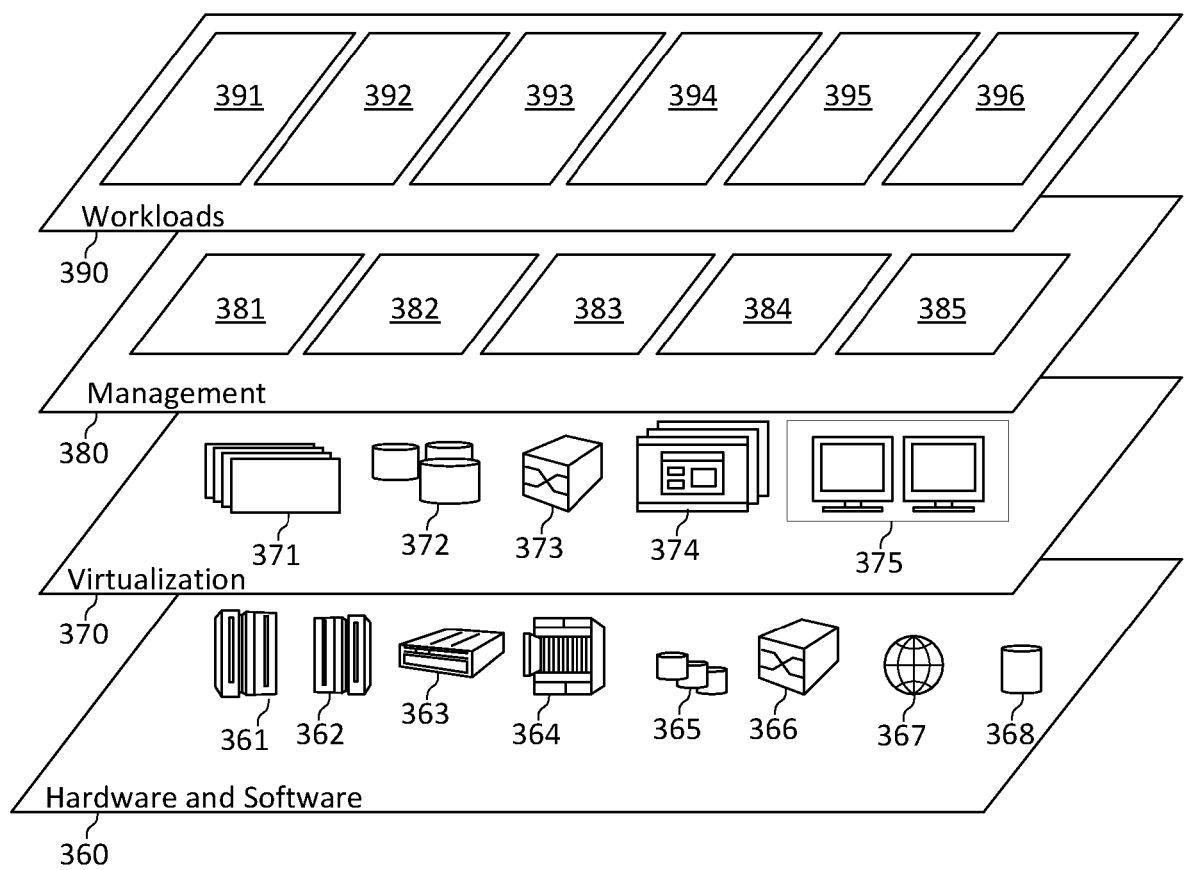
FIG. 3 depicts abstraction model layers according to an embodiment of the present disclosure.

Referring now to FIG. 3, a set of functional abstraction layers provided by cloud computing environment 200 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and webpage customization 396. Hereinafter, reference will be made to FIG. 4 to FIG. 10 to describe details of the webpage customization 396.

As described above, when presenting a website to a user, it is desirable to customize the website according to the user's favorite style. A website may include a single webpage or a collection of related webpages. Such customization requires changing the logo, fonts, background, icons, colors, and the like of each webpage according to the user's favorite style. However, how to figure out the user's favorite style and how to apply the style to each webpage would be difficult and time-consuming.

According to embodiments of the present disclosure, a target webpage to be provided to a user can be obtained. The target webpage comprises at least a first element having a first set of style attributes. A second element can be determined from a set of elements customized for the user, which matches the first element and has a second set of style attribute. The set of elements can be extracted from at least one sample webpage customized for the user. The target webpage can be customized by applying at least part of the second set of style attributes to the first element. Then, the customized target webpage can be provided to the user. As such, the webpage customization can be implemented automatically with high efficiency, without needing to change any source code.

Figure 4:
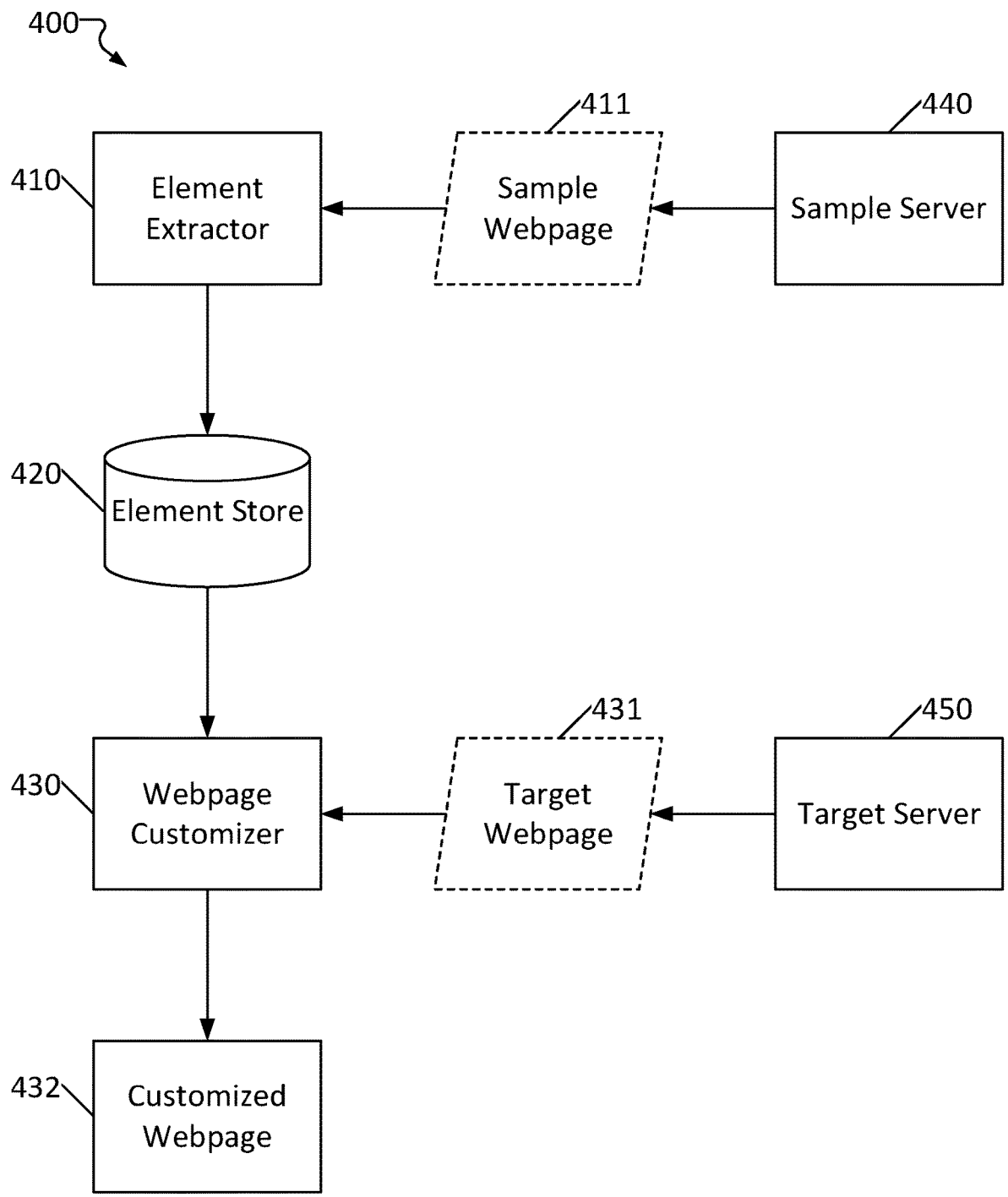
FIG. 4 illustrates a high-level block diagram of an example webpage customization system, consistent with several embodiments of the present disclosure.

FIG. 4 illustrates a high-level block diagram of an example webpage customization system 400, consistent with several of the present disclosure. It is to be understood that the structure and functionality of the system 400 are described only for the purpose of illustration without suggesting any limitations as to the scope of the present disclosure. The embodiments of the present disclosure can be embodied with a different structure and/or functionality.

As shown in FIG. 4, the system 400 may generally comprise an element extractor 410, an element store 420 and a webpage customizer 430. In some embodiments, the element extractor 410, the element store 420 and the webpage customizer 430 can be implemented in different physical devices, respectively. Alternatively, in some embodiments, some of the element extractor 410, the element store 420 and the webpage customizer 430 can be implemented in a same physical device. For example, the element extractor 410, the element store 420 and/or the webpage customizer 430 may be implemented by computing system 100 of FIG. 1.

The element extractor 410 may extract elements from webpages customized for a user. As used herein, a webpage customized for the user may also be referred to as a "sample webpage." As shown in FIG. 4, the element extractor 410 may obtain, based on a sample webpage address (for example, a Uniform Resource Locator) and from a sample server 440, at least one sample webpage 411 customized for the user. The sample server 440 may be a web server which stores the at least one sample webpage customized for the user. The element extractor 410 may analyze source codes of the at least one sample webpage 411 and extract elements from the at least one sample webpage 411. The extracted elements may include, but are not limited to, buttons, text fields, icons, checkboxes, forms, dropdown lists, and so on. In some embodiments, the element extractor 410 may extract a plurality of tags and a plurality of style attributes of each element from the at least one sample webpage 411. The extracted elements including their respective tags and style attributes can be stored in the element store 420 by the element extractor 410.

Figure 5:
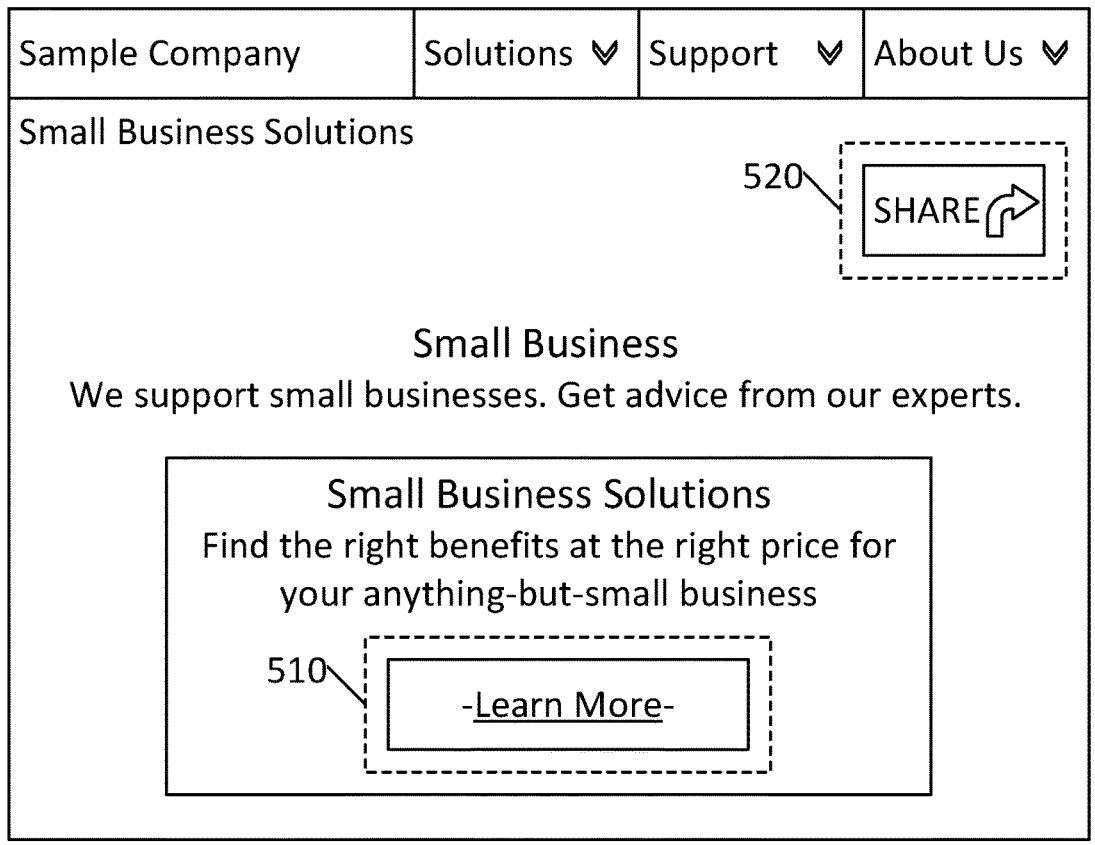
FIG. 5 depicts an example schematic diagram for extracting elements from a sample webpage, consistent with several embodiments of the present disclosure.

FIG. 5 depicts an example schematic diagram for extracting elements from a sample webpage, consistent with several embodiments of the present disclosure. For example, FIG. 5 illustrates an example of a sample webpage 411, which includes buttons 510 and 520. The buttons 510 and 520 as well as their respective tags and style attributes can be extracted from the sample webpage 411 by analyzing the source code of the sample webpage 411. As shown in FIG. 5, for example, the extracted tags of each button may include an identifier, a type, a parent, a class, and the like, of the button. The style of each button can be decided by respective values of following style attributes of the button: border, display, padding, margin, height, width, color, font, or so on. Although buttons are taken as examples of elements, it is to be understood that this is merely for the purpose of illustration, without suggesting any limitation as to the scope of the present disclosure. Other elements (such as, for example, text fields, icons, checkboxes, forms, dropdown lists, and so on) as well as their respective tags and style attributes can be extracted from the sample webpage 411 and stored in the element store 420.

With reference back to FIG. 4, the user may send a request for a target webpage 431 to a target server 450. The target server 450 may be a web server which stores the target webpage 431. For example, the request may indicate a target webpage address (for example, a Uniform Resource Locator) of the target webpage 431. In response to the target server 450 sending the target webpage 431 to the user, the webpage customizer 430 may intercept the target webpage 431 from the target server 450. For example, the target webpage 431 may include a plurality of elements, such as, buttons, text fields, icons, checkboxes, forms, dropdown lists, and so on. The plurality of elements may have their respective tags and style attributes. The webpage customizer 430 may customize the target webpage 431 by customizing the plurality of elements for the user according to the elements stored in the element store 420. In some embodiments, for a first element in the target webpage 431, the webpage customizer 430 may determine, from the elements stored in the element store 420, a second element matching the first element. The second element may have style attributes customized for the user, which are different from style attributes of the first element. The webpage customizer 430 can apply at least part of the style attributes of the second element to the first element, so as to customize the style of the first element for the user. The webpage customizer 430 may customize each of the plurality of elements in the target webpage 431 in a same way and provide the customized webpage 432 to the user.

In some embodiments, in order to determine the second element matching the first element, the web customizer 430 may determine a matching score between the first element and each of the elements stored in the element store 420. Then, the web customizer 430 may select, from the elements stored in the element store 420, an element having the highest matching score with the first element as the second element.

In some embodiments, in order to determine a matching score between two elements, the web customizer 430 may determine respective similarities between tags of one element and the corresponding tags of the other element. For example, the one element may have a tag "parent" with content "contentPanel," while the other element may have a same tag "parent" with content "mainLayout." The tag "parent" of an element indicates a parent element of the element. The similarity between the tags "parent" of the two elements can be determined based on a similarity between the strings "contentPanel" and "mainLayout." Then, the web customizer 430 may determine the matching score between the two elements based on the determined similarities and respective weights of the tags. For example, the matching store between two elements can be calculated as below:

$$\text{Score} = S_1 \cdot w_1 + S_2 \cdot W_2 + \ldots S_N \cdot W_N \quad (1)$$

where $S_i$ represents the similarity between the two elements with respect to a same tag i, $w_1$ represents a weight assigned to the tag i, N represents the number of tags to be compared, $1 \leq i \leq N$ and $\Sigma_1^N w_i = 1$.

Alternatively, in some embodiments, in order to determine the second element matching the first element, the web customizer 430 may identify, from the elements stored in the element store 420, at least one element of the same type as the first element. In response to the at least one element being identified, the web customizer 430 may determine, from the identified at least one element, the second element matching the first element. For example, the web customizer 430 may determine a matching score between the first element and each of the identified at least one element. Then, the web customizer 430 may select, from the identified at least one element, an element having the highest matching score with the first element as the second element. If no element of the same type as the first element can be identified, the web customizer 430 may determine the second element from the elements stored in the element store 420, as described above.

As an example, if the first element is a button, the web customizer 430 may firstly identify buttons from the elements stored in the element store 420 and determine the second element matching the first element from the identified buttons. That is, the determined second element will also be a button. If there is no button in the element store 420, the web customizer 430 may determine the second element matching the first element from the elements stored in the element store 420. That is, the determined second element will not be a button.

Figure 6:
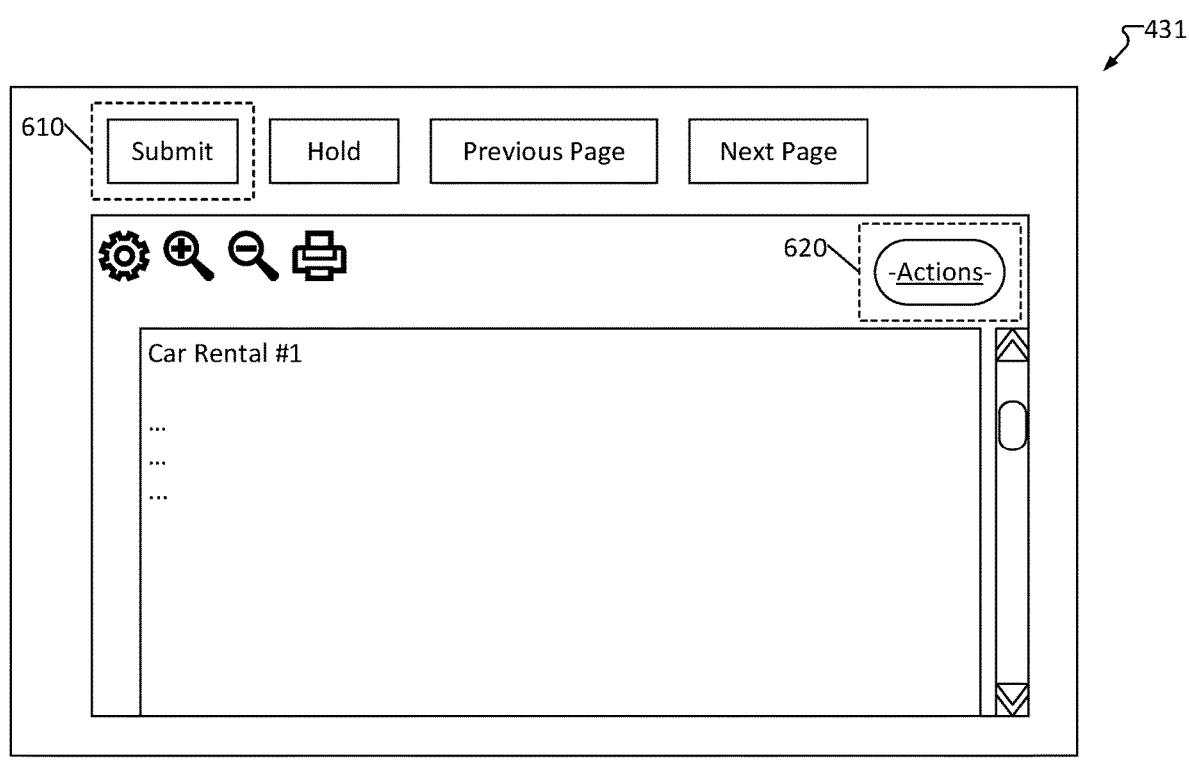
FIG. 6 depicts an example target webpage to be customized, consistent with several embodiments of the present disclosure.

FIG. 6 depicts an example target webpage 431 to be customized, consistent with several embodiments of the present disclosure. As shown in FIG. 6, for example, the target webpage 431 includes buttons 610 and 620. Notably, button 610 is a rectangle, does not have underlined text, does not include emphasis punctuation, and has only the first letter capitalized. Button 620 has a different format, being a "rounded rectangle," including underlined text and emphasis punctuation, also having only a first letter capitalized.

Figure 7:
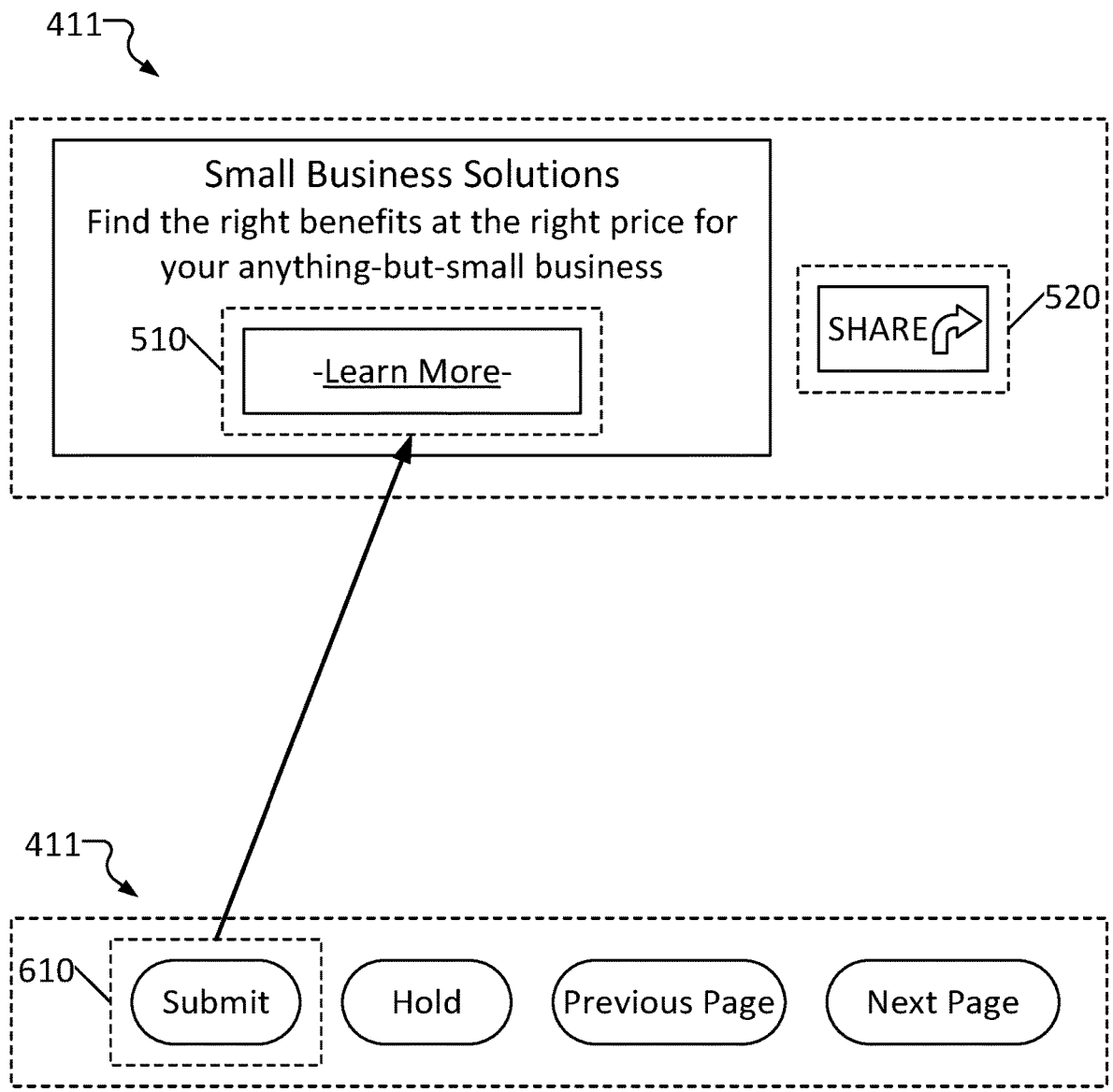
FIG. 7 depicts an example schematic diagram for element matching, consistent with several embodiments of the present disclosure.

FIG. 7 depicts an example schematic diagram for element matching, consistent with several embodiments of the present disclosure. As shown in FIG. 7, information about the buttons 510 and 520 can be extracted from the sample webpage 411 and stored in the element store 420. Regarding the button 610 in the target webpage 431, a matching score between the button 610 and each of the buttons 510 and 520 can be calculated as the above formula (1). Since the matching score between the button 610 and the button 510 exceeds the matching score between the button 610 and the button 520, it can be determined that the button 510 from the sample page 411 matches the button 610.

In some embodiments, prior to applying the style attributes of the second element to the first element, a result of the element matching can be provided to the user for confirmation. In some cases, the user may adjust the result of the element matching. For example, the user may indicate that the first element matches a third element instead of the determined second element.

Figure 8:
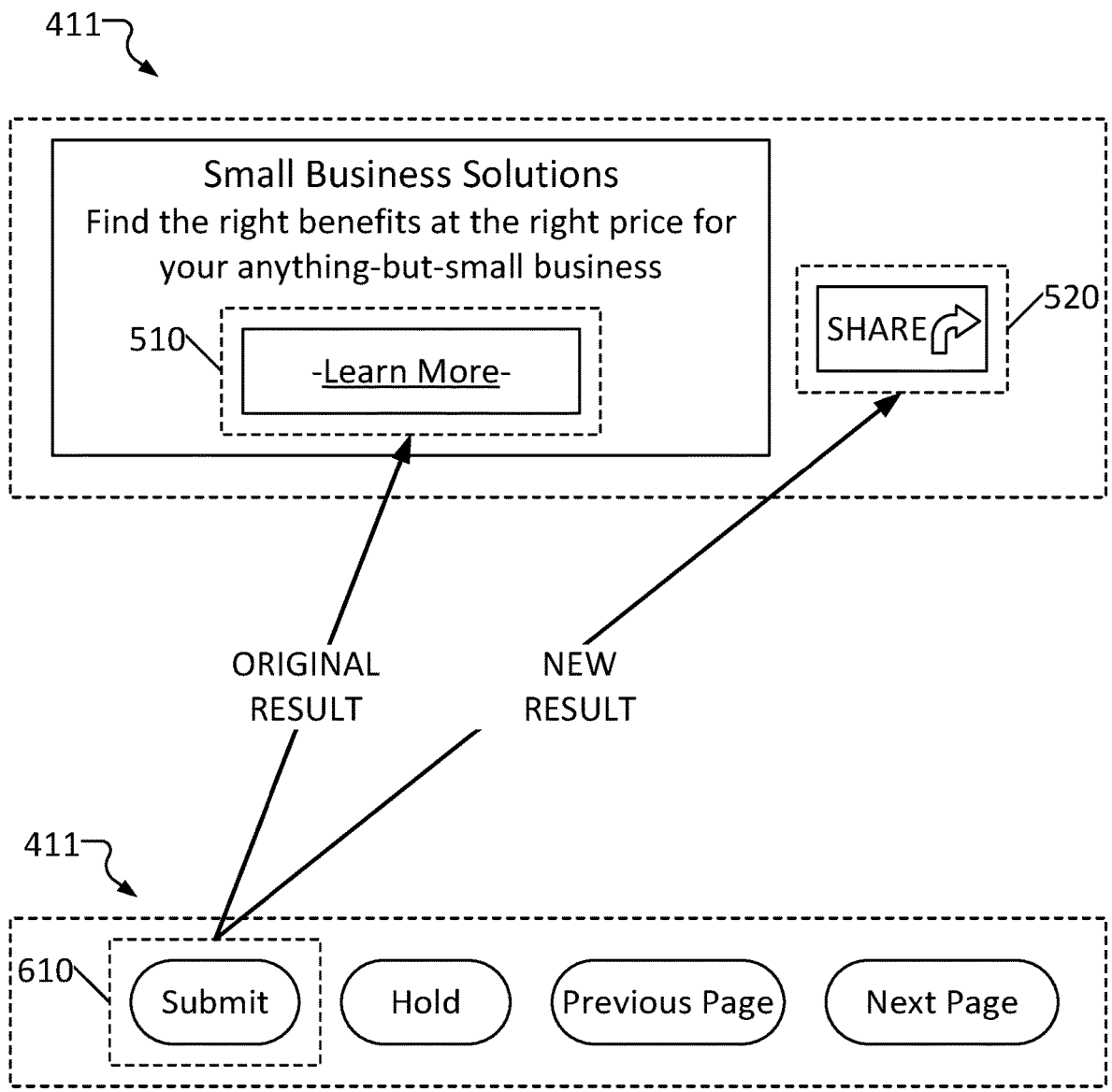
FIG. 8 depicts an example schematic diagram for adjusting a result of the element matching, consistent with several embodiments of the present disclosure.

FIG. 8 depicts an example schematic diagram for adjusting a result of the element matching, consistent with several embodiments of the present disclosure. As shown in FIG. 8, the original matching result shows that the button 510 in the sample webpage 411 matches the button 610 in the target webpage 431. The user may adjust the original matching result by indicating that the button 520, instead of the button 510, matches the button 610.

In some embodiments, in response to receiving the indication that the first element matches a third element in the element store 420, the webpage customizer 430 may adjust the weights $w_i$ (where $1 \leq i \leq N$) for determining matching scores in the above formula (1), such that the third element has the highest matching score with the first element. It is to be understood that any suitable algorithm currently known or to be developed in the future can be used for adjusting the weights. The scope of the present disclosure will not be limited in this aspect. For example, a logistic regression algorithm can be used for adjusting the weights.

In this way, the webpage customizer 430 can determine, from the elements stored in the element store 420, the second element matching the first element. For example, the second element may have style attributes customized for the user, which are different from the original style attributes of the first element. The webpage customizer 430 may apply at least part of the style attributes of the second element to the first element, so as to customize the style of the first element for the user. Similarly, the webpage customizer 430 may customize each of the elements in the target webpage 431 and provide the customized webpage 432 to the user.

Figure 9:
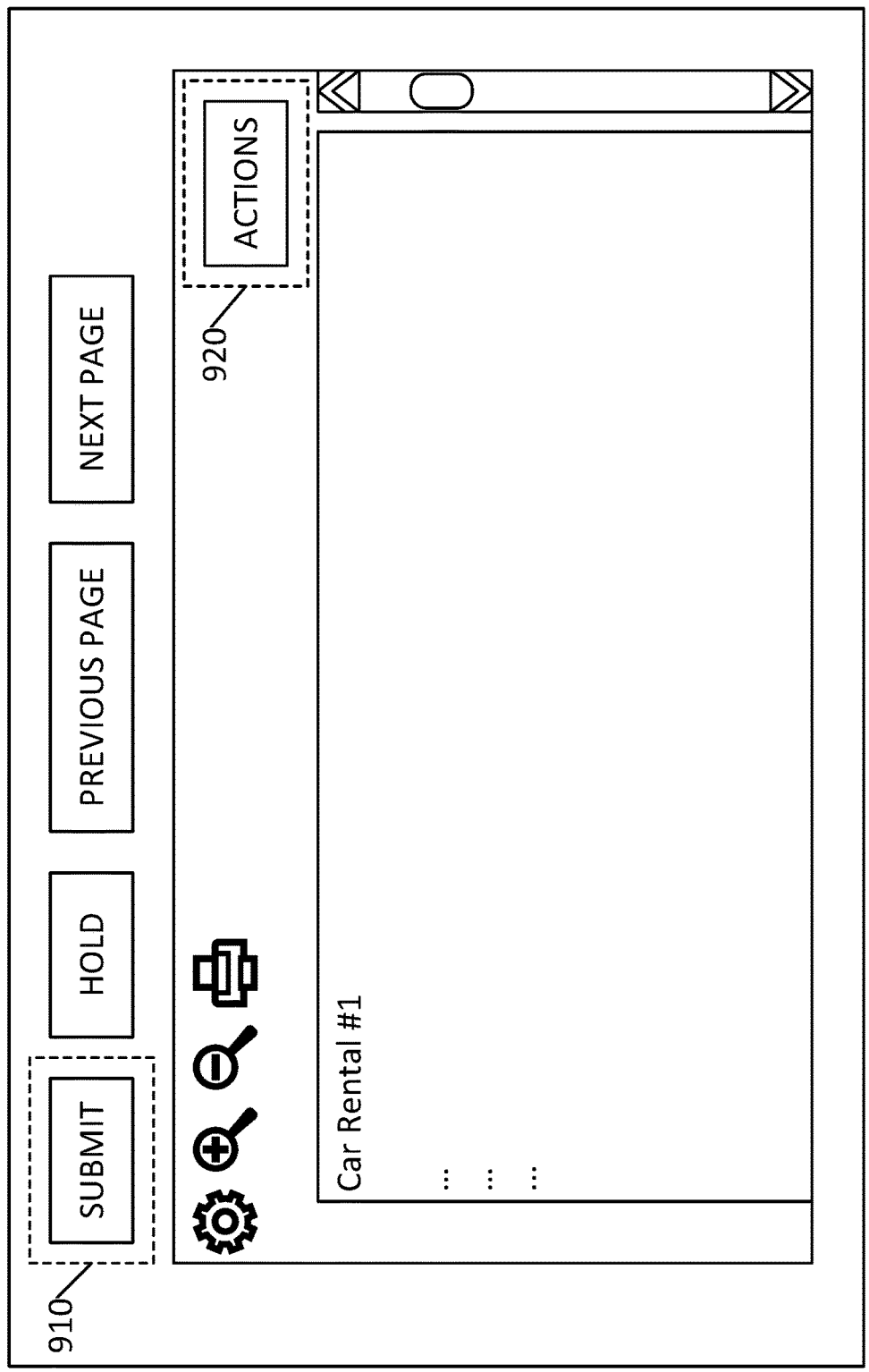
FIG. 9 depicts an example customized target webpage, consistent with several embodiments of the present disclosure.

FIG. 9 depicts an example customized target webpage 432, consistent with several embodiments of the present disclosure. As shown in FIG. 9, compared with the original target webpage 431 as shown in FIG. 6, the button 610 has been customized according to the style of the button 520, resulting in button 910, and the button 620 has been customized according to the style of the button 510, resulting in button 920. For example, all characters of the buttons 910, 920 are capitalized and not underlined, and the buttons 910, 920 are "sharp"-cornered rectangles in the customized target webpage 432 as seen in FIG. 9. It can also be seen that some other elements in the target webpage 432 have been customized according to the style of the sample webpage 411 as shown in FIG. 5.

Figure 10:
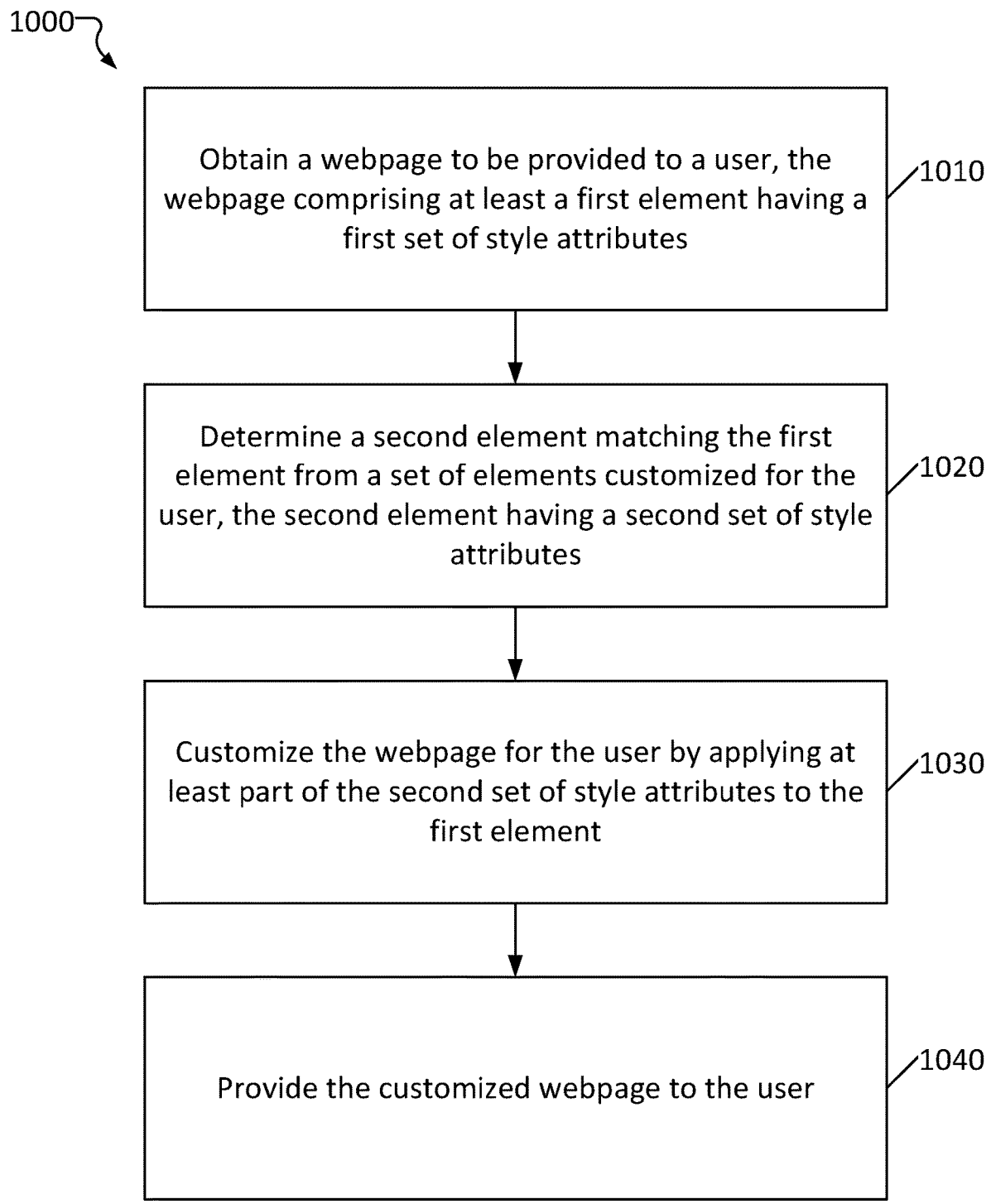
FIG. 10 depicts a flowchart of an example method for webpage customization according to embodiments of the present disclosure.

FIG. 10 depicts a flowchart of an example method 1000 for webpage customization according to embodiments of the present disclosure. For example, the method 1000 may be implemented by the system 400 as shown in FIG. 4 or, at least in part, by computer system 100 as shown by FIG. 1. It is to be understood that the method 1000 may also comprise additional blocks (not shown) and/or may omit the illustrated blocks. The scope of the present disclosure described herein is not limited in this aspect.

At block 1010, the system 400 (for example, the webpage customizer 430) obtains a webpage to be provided to a user, the webpage comprising at least a first element having a first set of style attributes.

In some embodiments, in response to a server where the webpage is stored sending the webpage to the user, the system 400 (for example, the webpage customizer 430) may intercept the webpage from the server.

At block 1020, the system 400 (for example, the webpage customizer 430) determines a second element matching the first element from a set of elements customized for the user, the second element having a second set of style attributes.

In some embodiments, in order to obtain the set of elements customized for the user, the system 400 (for example, the element extractor 410) may obtain at least one webpage customized for the user and extract the set of elements from the at least one webpage.

In some embodiments, in order to determine the second element, the system 400 (for example, the webpage customizer 430) may determine a matching score between the first element and each of the set of elements and select an element having the highest matching score with the first element from the set of elements as the second element.

In some embodiments, in order to determine a matching score between the first element and each of the set of elements, the system 400 (for example, the webpage customizer 430) may determine, for each element in the set of elements, respective similarities between a plurality of tags of the first element and a plurality of corresponding tags of the element and determine a matching score between the first element and the element based on the similarities and respective weights of the plurality of tags.

In some embodiments, in response to receiving an indication that the first element matches a third element in the set of elements from the user, the system 400 (for example, the webpage customizer 430) may adjust the weights of the plurality of tags, such that the third element has the highest matching score with the first element.

In some embodiments, in order to determine the second element, the system 400 (for example, the webpage customizer 430) may identify at least one element of the same type as the first element from the set of elements and determine the second element from the at least one element.

In some embodiments, in order to determine the second element from the at least one element, the system 400 (for example, the webpage customizer 430) may determine a matching score between the first element and each of the at least one element and select an element having the highest matching score with the first element from the at least one element as the second element.

At block 1030, the system 400 (for example, the webpage customizer 430) customizes the webpage for the user by applying at least part of the second set of style attributes to the first element.

At block 1040, the system 400 (for example, the webpage customizer 430) provides the customized webpage to the user.

It can be seen that, according to embodiments of the present disclosure, a target webpage to be provided to a user can be obtained. The target webpage comprises at least a first element having a first set of style attributes. A second element can be determined from a set of elements customized for the user, which matches the first element and has a second set of style attribute. The set of elements can be extracted from at least one sample webpage customized for the user. The target webpage can be customized by applying at least part of the second set of style attributes to the first element. Then, the customized target webpage can be provided to the user. As such, the webpage customization can be implemented automatically with high efficiency, without needing to change any source code.

It should be noted that the webpage customization according to embodiments of this disclosure could be implemented by computing system 100 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining, by one or more processors, a webpage to be provided to a user, the webpage comprising at least a first element having a first set of style attributes;
    determining, by the one or more processors for each element of a set of elements:
        respective similarities between a plurality of tags of the first element and a plurality of corresponding tags of the element; and
        a matching score between the first element and the element based on the similarities and respective weights of the plurality of tags;
    selecting, by the one or more processors, a second element from the set of elements, the second element having a highest matching score with the first element;
    receiving, from the user, an indication that the first element matches a third element in the set of elements, the third element having a second set of style attributes;
    adjusting, by the one or more processors in response to the receiving, the weights of the plurality of tags, such that the third element has the highest matching score with the first element;
    customizing, by the one or more processors, the webpage for the user by applying at least part of the second set of style attributes to the first element; and
    providing, by the one or more processors, the customized webpage to the user.

2. The method of claim 1, further comprising:
    obtaining, by the one or more processors, at least one webpage customized for the user; and
    extracting, by the one or more processors, the set of elements from the at least one webpage.

3. The method of claim 1, wherein obtaining the webpage includes, intercepting, by one or more processors responsive to a server where the webpage is stored sending the webpage to the user, the webpage from the server.

4. The method of claim 1, wherein selecting the second element includes:
    identifying, by the one or more processors, one or more elements of a same type as the first element from the set of elements; and
    selecting, by one or more processors, the second element from the one or more elements.

5. A system comprising:
    a processing unit; and
    a memory coupled to the processing unit and storing instructions thereon, the instructions, when executed by the processing unit, performing actions comprising:
        obtaining a webpage to be provided to a user, the webpage comprising at least a first element having a first set of style attributes;
        determining, for each element of a set of elements:
            respective similarities between a plurality of tags of the first element and a plurality of corresponding tags of the element; and
            a matching score between the first element and the element based on the similarities and respective weights of the plurality of tags;
        selecting a second element from the set of elements, the second element having a highest matching score with the first element;
        receiving, from the user, an indication that the first element matches a third element in the set of elements, the third element having a second set of style attributes;
        adjusting, in response to the receiving, the weights of the plurality of tags, such that the third element has the highest matching score with the first element;
        customizing the webpage for the user by applying at least part of the second set of style attributes to the first element; and
        providing the customized webpage to the user.

6. The system of claim 5, wherein the actions further comprise:
    obtaining at least one webpage customized for the user; and
    extracting the set of elements from the at least one webpage.

7. The system of claim 5, wherein obtaining the webpage includes:
    in response to a server where the webpage is stored sending the webpage to the user, intercepting the webpage from the server.

8. The system of claim 5, wherein selecting the second element includes:
    identifying at least one element of a same type as the first element from the set of elements; and
    selecting the second element from the at least one element.

9. A computer program product being tangibly stored on a non-transient machine-readable medium and comprising machine-executable instructions, the instructions, when executed on a device, causing the device to perform actions comprising:
    obtaining a webpage to be provided to a user, the webpage comprising at least a first element having a first set of style attributes;
    determining, for each element of a set of elements:
        respective similarities between a plurality of tags of the first element and a plurality of corresponding tags of the element; and a matching score between the first element and the element based on the similarities and respective weights of the plurality of tags;

selecting a second element from the set of elements, the second element having a highest matching score with the first element;

receiving, from the user, an indication that the first element matches a third element in the set of elements, the third element having a second set of style attributes;

adjusting, in response to the receiving, the weights of the plurality of tags, such that the third element has the highest matching score with the first element;

customizing the webpage for the user by applying at least part of the second set of style attributes to the first element; and providing the customized webpage to the user.

10. The computer program product of claim 9, wherein the actions further comprise:

obtaining at least one webpage customized for the user; and extracting the set of elements from the at least one webpage.

11. The computer program product of claim 9, wherein obtaining the webpage comprises:

in response to a server where the webpage is stored sending the webpage to the user, intercepting the webpage from the server.

12. The computer program product of claim 9, wherein selecting the second element includes:

identifying at least one element of a same type as the first element from the set of elements; and selecting the second element from the at least one element.

* * * * *